US012646764B2

(12) United States Patent
Lubomirsky et al.

(10) Patent No.: US 12,646,764 B2
(45) Date of Patent: Jun. 2, 2026

(54) METHOD FOR RECOVERING VALUABLE METALS FROM SPENT LITHIUM-ION-BATTERIES

(71) Applicant: YEDA RESEARCH AND DEVELOPMENT CO. LTD., Rehovot (IL)

(72) Inventors: Igor Lubomirsky, Petach-Tikva (IL); Valery Kaplan, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 710 days.

(21) Appl. No.: 17/735,227

(22) Filed: May 3, 2022

(65) Prior Publication Data

US 2022/0263147 A1    Aug. 18, 2022

Related U.S. Application Data

(63) Continuation-in-part of application No. PCT/IL2021/050299, filed on Mar. 18, 2021.

(30) Foreign Application Priority Data

Mar. 19, 2020    (IL) .......................................... 273457

(51) Int. Cl.
| | |
|---|---|
| *H01M 10/54* | (2006.01) |
| *B03B 9/06* | (2006.01) |
| *B09B 3/35* | (2022.01) |
| *B09B 3/40* | (2022.01) |
| *B09B 3/70* | (2022.01) |

(Continued)

(52) U.S. Cl.
CPC ............... *H01M 10/54* (2013.01); *B03B 9/06* (2013.01); *B09B 3/35* (2022.01); *B09B 3/40* (2022.01); *B09B 3/70* (2022.01); *C22B 1/00* (2013.01); *C22B 26/12* (2013.01); *B03B 2009/066* (2013.01); *B09B 2101/16* (2022.01)

(58) Field of Classification Search
CPC ......... H01M 6/52; H01M 10/54; C22B 26/12
See application file for complete search history.

(56) References Cited

U.S. PATENT DOCUMENTS

| | | | |
|---|---|---|---|
| 2,828,200 A | 3/1958 | Nixon | |
| 2,860,045 A | 11/1958 | Nixon et al. | |

(Continued)

FOREIGN PATENT DOCUMENTS

| | | |
|---|---|---|
| CN | 1904094 A | 1/2007 |
| CN | 102923796 A | 2/2013 |

(Continued)

OTHER PUBLICATIONS

CN109652655A English language translation (Year: 2019).*

(Continued)

*Primary Examiner* — Sally A Merkling
*Assistant Examiner* — Sean P. O'Keefe
(74) *Attorney, Agent, or Firm* — Mark S. Cohen; PEARL COHEN ZEDEK LATZER BARATZ LLP

(57) ABSTRACT

This invention is directed to a method for recovering valuable metals from spent lithium-ion-batteries using $CO_2$/CO/$H_2O$ gas mixture, or reducing gas comprising $CH_4$, or solid carbon or combination thereof.

14 Claims, 5 Drawing Sheets

(51) Int. Cl.
  C22B 1/00 (2006.01)
  C22B 26/12 (2006.01)
  B09B 101/16 (2022.01)

(56) References Cited

U.S. PATENT DOCUMENTS

| | | | |
|---|---|---|---|
| 3,021,209 A | 2/1962 | Murray et al. | |
| 3,951,648 A | 4/1976 | Stern et al. | |
| 3,986,982 A | 10/1976 | Crowson et al. | |
| 4,074,865 A | 2/1978 | Gibbon | |
| 4,353,740 A | 10/1982 | Dunn | |
| 4,608,083 A | 8/1986 | Holmstrom et al. | |
| 4,960,573 A | 10/1990 | Okutani et al. | |
| 5,074,910 A | 12/1991 | Dubrovsky | |
| 5,102,632 A | 4/1992 | Allen et al. | |
| 5,104,445 A | 4/1992 | Dubrovsky et al. | |
| 5,169,503 A | 12/1992 | Baughman et al. | |
| 5,190,625 A | 3/1993 | Seon et al. | |
| 5,484,470 A | 1/1996 | Kristjansdottir et al. | |
| 6,455,018 B1 | 9/2002 | Cuif | |
| 7,291,202 B2 | 11/2007 | Asano et al. | |
| 7,601,318 B2 | 10/2009 | Armand et al. | |
| 7,645,320 B2 | 1/2010 | Evans | |
| 7,972,412 B2 | 7/2011 | Bergeron et al. | |
| 8,734,714 B2 | 5/2014 | Harris et al. | |
| 8,852,547 B2 | 10/2014 | Ma et al. | |
| 8,974,572 B2 | 3/2015 | Uehara et al. | |
| 9,194,022 B2 | 11/2015 | Roy et al. | |
| 10,167,532 B2 | 1/2019 | Laucournet et al. | |
| 10,457,999 B2 | 10/2019 | Lubomirsky et al. | |
| 2004/0033360 A1 | 2/2004 | Armand et al. | |
| 2007/0131058 A1 | 6/2007 | Bergeron et al. | |
| 2008/0083300 A1 | 4/2008 | Evans | |
| 2009/0226352 A1 | 9/2009 | Hsu et al. | |
| 2010/0257978 A1 | 10/2010 | Bergeron et al. | |
| 2013/0089477 A1 | 4/2013 | Uehara | |
| 2013/0177487 A1 | 7/2013 | Roy et al. | |
| 2016/0145714 A1 | 5/2016 | Liddell et al. | |
| 2017/0145542 A1 | 5/2017 | Lubomisky et al. | |
| 2018/0171434 A1 | 6/2018 | Beggren et al. | |
| 2019/0256948 A1 | 8/2019 | Lubomirsky et al. | |
| 2020/0032370 A1 | 1/2020 | Lubomirsky et al. | |
| 2020/0033239 A1 | 1/2020 | McPeak et al. | |
| 2020/0332391 A1 | 10/2020 | Lubomirsky et al. | |
| 2021/0017654 A1 | 1/2021 | Grader et al. | |
| 2022/0002890 A1 | 1/2022 | Lubomirsky et al. | |
| 2022/0274841 A1* | 9/2022 | Rohde | C01D 15/02 |
| 2022/0352571 A1* | 11/2022 | Hong | H01M 4/583 |

FOREIGN PATENT DOCUMENTS

| | | | | |
|---|---|---|---|---|
| CN | 103258730 A | | 8/2013 | |
| CN | 105400962 A | | 3/2016 | |
| CN | 106910889 A | * | 6/2017 | |
| CN | 107046154 A | * | 8/2017 | H01M 10/54 |
| CN | 107742760 A | | 2/2018 | |
| CN | 109652655 A | | 4/2019 | |
| CN | 110938743 A | | 3/2020 | |
| DE | 4429895 A1 | | 2/1995 | |
| DE | 102013205408 | | 10/2014 | |
| EP | 0396252 A1 | | 11/1990 | |
| EP | 0538320 | | 6/1994 | |
| GB | 798712 A | | 7/1958 | |
| JP | S 5032018 A | | 3/1975 | |
| JP | S 51123723 | | 10/1976 | |
| JP | H 02301528 A | | 12/1990 | |
| JP | H 0313532 A | | 1/1991 | |
| JP | H04329804 A | | 11/1992 | |
| JP | 2000144275 A | | 5/2000 | |
| JP | 2001026426 A | | 1/2001 | |
| JP | 2001335852 A | | 4/2001 | |
| JP | 2001152265 A | | 6/2001 | |
| JP | 2003073754 A | | 3/2003 | |
| JP | 2012229481 A | | 11/2012 | |
| JP | 2012219326 A | | 12/2012 | |
| JP | 2016056393 A | | 4/2016 | |
| JP | 2018197385 A | | 12/2018 | |
| JP | 6651115 B1 | | 2/2020 | |
| KR | 100959928 B1 | | 10/2009 | |
| KR | 101911633 B1 | | 10/2018 | |
| KR | 101974589 B1 | | 5/2019 | |
| WO | WO1999/022036 | | 5/1999 | |
| WO | WO2017145099 A1 | | 8/2007 | |
| WO | WO 2008/131856 A2 | | 11/2008 | |
| WO | WO 2012/101398 | | 8/2012 | |
| WO | WO 2014/091456 A1 | | 6/2014 | |
| WO | WO 2015/193901 A1 | | 12/2015 | |
| WO | WO2017/006209 | | 1/2017 | |
| WO | WO 2018/078632 A1 | | 5/2018 | |
| WO | WO 2019/087193 A1 | | 5/2019 | |
| WO | WO 2022/003694 | | 1/2022 | |

OTHER PUBLICATIONS

Situ, Wenfu, et al. "Effect of high temperature environment on the performance of LiNi0. 5Co0. 2Mn0. 3O2 battery." International Journal of Heat and Mass Transfer 104 (2017): 743-748. (Year: 2017).*

Yuan, Min, et al. "Surfactant-assisted hydrothermal synthesis of V2O5 coated LiNi1/3Co1/3Mn1/3O2 with ideal electrochemical performance." Electrochimica Acta 323 (2019): 134822. (Year: 2019).*

Asabe et al. "Recycling of rare earth magnet scraps: Part I carbon removal by high temperature oxidation" Materials transactions. 2001;42(12):2487-91.

Assefi et al. "Pyrometallurgical recycling of Li-ion, Ni—Cd and Ni—MH batteries: A minireview" Current Opinion in Green and Sustainable Chemistry. Aug. 1, 2020;24:26-31.

Bae et al. "Effects of DyHx and Dy2O3 powder addition on magnetic and microstructural properties of Nd—Fe—B sintered magnets" Journal of Applied Physics. Nov. 1, 2012;112(9):093912.

Binnemans et al. "Recycling of rare earths: a critical review" Journal of cleaner production. Jul. 15, 2013;51:1-22.

Cadogan et al. "Hydrogen absorption and desorption in Nd2Fe14B" Applied physics letters. Feb. 10, 1986;48(6):442-4.

Chase MW, "National Information Standards Organization (US). NIST-JANAF thermochemical tables" Washington, DC: American Chemical Society; Aug. 1, 1998.

Cojocaru et al. "Modification of the Bloch law in ferromagnetic nanostructures" EPL (Europhysics Letters). Mar. 31, 2014;106(1):17001.

Diborane B2H6 Safety Data Sheet P-4586 (Praxair), 2016.

Dong et al. "Recovery of platinum group metals from spent catalysts: a review" International Journal of Mineral Processing. Dec. 10, 2015;145:108-13.

Eliaz et al. "Hydrogen-assisted processing of materials" Materials Science and Engineering: A. Sep. 30, 2000;289(1-2):41-53.

Firdaus et al. "Review of high-temperature recovery of rare earth (Nd/Dy) from magnet waste" Journal of Sustainable Metallurgy. Dec. 2016;2(4):276-95.

Fornalczyk et al. "Removal of platinum group metals from the used auto catalytic converter" Metalurgija. Apr. 1, 2009;48(2):133-6.

Fornalczyk A. "Industrial catalysts as a source of valuable metals" JAMME. 2012;55(2):864-68.

Frayne C. "Boiler water treatment: principles and practice" Chemical Publishing Company; 2002.

Gupta et al. "Extractive metallurgy of rare earths" International materials reviews. Jan. 1, 1992;37(1):197-248.

Gutfleisch et al. "Recycling Used Nd—Fe—B Sintered Magnets via a Hydrogen-Based Route to Produce Anisotropic, Resin Bonded Magnets" Advanced Energy Materials. Feb. 2013;3(2):151-5.

Hagelüken BC. "Recycling the platinum group metals: a European perspective" Platinum Metals Review. Jan. 1, 2012;56(1):29-35.

Harris et al. "The hydrogen decrepitation of an Nd15Fe7788 magnetic alloy" Journal of the Less Common Metals. Mar. 1, 1985;106(1):L1-4.

Harris et al. "Hydrogen: its use in the processing of NdFeB-type magnets" Journal of the Less common Metals. Jan. 1, 1991;172:1273-84.

(56) References Cited

OTHER PUBLICATIONS

Hoffmann JE. "Recovery of platinum-group metals from gabbroic rocks metals from auto catalysts" JOM. Jun. 1, 1988;40(6):40-4.

Horiuchi et al. "Investigation of heating conditions for cobalt recycling from spent lithium ion batteries by magnetic separation" Kagaku Kogaku Ronbunshu. 2017;43(4):213-8.

Hu et al. "A promising approach for the recovery of high value-added metals from spent lithium-ion batteries" Journal of Power Sources. May 31, 2017;351:192-9.

International Search Report for PCT Application No. PCT/IL2021/050299 dated Jun. 8, 2021.

Isnard et al. "Neutron-diffraction study of the insertion scheme of hydrogen in Nd2Fe14B" Journal of applied physics. Aug. 1, 1995;78(3):1892-8.

Itakura et al. "Resource recovery from Nd—Fe—B sintered magnet by hydrothermal treatment" Journal of Alloys and Compounds. Feb. 9, 2006;408:1382-5.

Itoh et al. "Novel rare earth recovery process on Nd—Fe—B magnet scrap by selective chlorination using NH4Cl" Journal of Alloys and Compounds. May 27, 2009;477(1-2):484-7.

Jha et al. "Hydrometallurgical recovery/recycling of platinum by the leaching of spent catalysts: A review" Hydrometallurgy. Feb. 1, 2013;133:23-32.

Kamimoto et al. "Electrodeposition of rare-earth elements from neodymium magnets using molten salt electrolysis" Journal of Material Cycles and Waste Management. Oct. 2018;20(4):1918-22.

Khaliq et al. "Metal extraction processes for electronic waste and existing industrial routes: a review and Australian perspective" Resources. Feb. 19, 2014;3(1):152-79.

"kiln" Merriam-Webster.com dictionary, Merriam-Webster, https://www.merriam-webster.com/dicitonary/kiln. Accessed Feb. 9, 2022.

Kim et al. "Effects of carbon monoxide addition to chlorine plasma-treated platinum films" Applied surface science. Feb. 2, 2000;156(1-4):9-15.

Kim et al. "A process for extracting precious metals from spent printed circuit boards and automobile catalysts" JOM. Dec. 1, 2004;56(12):55-8.

Li et al. "Recycling of scrap sintered Nd—Fe—B magnets as anisotropic bonded magnets via hydrogen decrepitation process" Journal of Material Cycles and Waste Management. Jul. 2015; 17(3):547-52.

Lloyd DD. "Standard sieves and Mesh sizes" Analytical Chemistry Resources. The University of The West Indies. 2000, 4 pages; including Appendix 'Standard sieves and Particle size conversions' (4 pages).

Meakin et al. "3-D laser confocal microscopy study of the oxidation of NdFeB magnets in atmospheric conditions" Applied Surface Science. Aug. 15, 2016;378:540-4.

Menad et al. "Characteristics of nd—fe—b permanent magnets present in electronic components" Int. J. Waste Resour. 2017;7(01):1-7.

Meshram et al. "Extraction of lithium from primary and secondary sources by pre-treatment, leaching and separation: A comprehensive review" Hydrometallurgy. Dec. 1, 2014;150:192-208.

Meyer G. "The Reduction of Rare-Earth Metal Halides with Unlike Metals—Wöhler's Metallothermic Reduction" Zeitschrift für anorganische und allgemeine Chemie. Nov. 2007;633(15):2537-52.

Mochizuki et al. "Selective recovery of rare earth elements from Dy containing NdFeB magnets by chlorination" ACS Sustainable Chemistry & Engineering. Jun. 3, 2013;1(6):655-62.

Office Action for Chinese Patent Application No. 201880071337.8 issued on Sep. 29, 2021. This Office Action cites Zhang of item 17 and Zhang of item 18.

Office Action for Chinese Patent Application No. 201880071337.8 (English translation) issued on Apr. 20, 2022. This Office Action cites Xu of item 14.

Ojeda et al. "Recovery of palladium from an exhausted catalyst by chlorination: effect of carbon content and thermal treatment" Transactions of the Institution of Mining and Metallurgy. Section C. Mineral Processing and Extractive Metallurgy. Jan. 1999;108.

Okabe et al. "Direct extraction and recovery of neodymium metal from magnet scrap" Materials Transactions. 2003;44(4):798-801.

Önal et al. "Comparative oxidation behavior of Nd—Fe—B magnets for potential recycling methods: Effect of hydrogenation pretreatment and magnet composition" Journal of Alloys and Compounds. Dec. 25, 2017;728:727-38.

Osborn JA. "Demagnetizing factors of the general ellipsoid" Physical review. Jun. 1, 1945;67(11-12):351.

Park et al. "Platinum Etching in an Inductively Coupled Plasma" In Solid State Device Research Conference, 1996. ESSDERC'96. Proceedings of the 26th European Sep. 9, 1996 (pp. 631-634). IEEE.

Pathak et la. "Cerium: an unlikely replacement of dysprosium in high performance Nd—Fe—B permanent magnets" Advanced Materials. Apr. 2015;27(16):2663-7.

Peelman et al. "Recovery of REEs from end-of-life permanent magnet scrap generated in WEEE recycling plants" In Extraction 2018 2018 (pp. 2619-2631). Springer, Cham.

Peukert et al. "Industrial separation of fine particles with difficult dust properties" Powder technology. Aug. 8, 2001;118(1-2):136-48.

Pietrelli et al. "Automotive spent catalysts treatment and platinum recovery" International Journal of Environment and Waste Management. Jan. 1, 2013;11(2):222-32.

Saguchi et al. "Recycling of rare earth magnet scraps part III carbon removal from Nd magnet grinding sludge under vacuum heating" Materials transactions. 2002;43(2):256-60.

Saguchi et al. "Recycling of rare earth magnet scraps: Carbon and oxygen removal from Nd magnet scraps" Journal of alloys and compounds. Feb. 9, 2006;408:1377-81.

Schwartz, Harold "Prokon Showme Software" The Calculation Companion (Year 1997).

Sheridan et al. "Anisotropic powder from sintered NdFeB magnets by the HDDR processing route" Journal of Magnetism and Magnetic Materials. Jan. 1, 2012;324(1):63-7.

Sheridan et al. "Improved HDDR processing route for production of anisotropic powder from sintered NdFeB type magnets" Journal of Magnetism and Magnetic Materials. Jan. 1, 2014;350:114-8.

Shirayama et al. "Selective extraction and recovery of Nd and Dy from Nd—Fe—B magnet scrap by utilizing molten MgCl2" Metallurgical and Materials Transactions B. Jun. 2018;49(3):1067-77.

Takeda et al. "Recycling of rare earth magnet waste by removing rare earth oxide with molten fluoride" Materials Transactions. Feb. 1, 2014;55(2):334-41.

Uda T. "Recovery of rare earths from magnet sludge by FeCl2" Materials Transactions. 2002;43(1):55-62.

Venkatesan et al. "Selective extraction of rare-earth elements from NdFeB magnets by a room-temperature electrolysis pretreatment step" ACS Sustainable Chemistry & Engineering. May 2, 20185;6(7):9375-82.

Walton et al. "The use of hydrogen to separate and recycle neodymium-iron-boron-type magnets from electronic waste" Journal of Cleaner Production. Oct. 1, 2015;104:236-41.

World Chlorine Council, Chlorine Safety Scrubbing System, April, 2-47 (2011).

Xu et al. "Supported Acidic Photocatalystic Materials and Applications" Northeast Normal University Press 2015, pp. 77-78. (English translation not available; however see aforementioned ref. item 12).

Yang et al. "REE recovery from end-of-life NdFeB permanent magnet scrap: a critical review" Journal of Sustainable Metallurgy. Mar. 2017;3(1):122-49.

Yoo JS. "Metal recovery and rejuvenation of metal-loaded spent catalysts" Catalysis Today. Sep. 30, 1998;44(1-4):27-46.

Yu, Yong, et al. "Progress of Platinum Group Metals Recovery from Spent Carrier Catalysts [J]." Hebei Chemical Industry 2 (2011).

Zakotnik et al. "Possible methods of recycling NdFeB-type sintered magnots using the HD/degassing process" Journal of Alloys and Compounds. Feb. 14, 2008;450(1-2):525-31.

Zakotnik et al. "Multiple recycling of NdFeB-type sintered magnets" Journal of Alloys and Compounds. Feb. 5, 2009;469(1-2):314-21.

Zeng et al. "Current status and future perspective of waste printed circuit boards recycling" Procedia Environmental Sciences. Jan. 1, 2012;16:590-7.

(56) References Cited

OTHER PUBLICATIONS

Zhang et al. "Gold Extraction Technology" 2013 Beijing: Metallurgical Industry Press. (English translation not available; however see item 15).

Zhang et al. "Modern Gold Smelting Technology" 2014 Beijing: Metallurgical Industry Press. (English translation not available; however see item 15).

Zheng et al. "A mini-review on metal recycling from spent lithium ion batteries" Engineering. Jun. 1, 2018;4(3):361-70.

"Electromagnetic Spectrum" Cosmos: , 2007, Swineburne University of Technology.

International Search Report for PCT Application No. PCT/IL2021/050811 dated Oct. 6, 2021.

Office action dated Jun. 25, 2024 for corresponding patent application No. JP2022-555807.

Office action dated Mar. 19, 2024 for related patent application No. JP2023-523700.

Renzel A. "Overview UV-lamps" 2012, UV-Technik Meyer GMBH.

Szymański et al. "Recycling of Nd—Fe—B magnets from scrap hard disc drives" Key Engineering Materials. Mar. 31, 2016;682:308-13.

Meng et al. "Clean production of rare earth oxide from rare earth chloride solution by electrical transformation" Hydrometallurgy. Nov. 1, 2020;197:105372.

* cited by examiner

METHOD FOR RECOVERING VALUABLE METALS FROM SPENT LITHIUM-ION-BATTERIES

CROSS REFERENCE TO RELATED APPLICATIONS

This application is a Continuation in Part from International Application No. PCT/IL2021/050299 filed Mar. 18, 2021, which claims the benefit of Israeli Application No. 273457 filed Mar. 19, 2020, the entire contents of which are hereby incorporated by reference herein.

FIELD OF THE INVENTION

This invention is directed to a method for recovering valuable metals from spent lithium-ion-batteries.

BACKGROUND OF THE INVENTION

Energy storage devices, and particularly rechargeable batteries such as lithium ion batteries (LIBs), are in high demand in consumer electronics and electric vehicles. LIBs have been significant such that they have become the most popular power source for portable electronics equipment. LIBs are used for a growing range of applications, as their capacity and charging rates are increased.

This increased demand has greatly stimulated LIBs production, which subsequently has led to greatly increased quantities of spent LIBs, which will have to be treated by suitable processes. Therefore, considerable efforts are underway to minimize environmental pollution and recover battery components.

The challenge in recycling spent LIBs derives from two sources. LIBs contain a variety of toxic substances, such as heavy metals, organic and inorganic compounds, which are prone to react in the environment and are ecologically harmful [Cao G. Solvent-salt synergy offers a safe pathway towards next generation high voltage Li-ion batteries. *Science China. Materials* 10 (2018): 1-3; Chen Y., Liu N., Hu F., Ye L., Xi Y., Yang S. Thermal treatment and ammoniacal leaching for the recovery of valuable metals from spent lithium-ion batteries. *Waste Management* 75 (2018): 469-476]. Some of these compounds are carcinogenic or otherwise toxic to humans. On the other hand, the grade of cobalt and lithium in lithium cobalt oxide ($LiCoO_2$)-based batteries is higher than that in pristine lithium and cobalt ores. Therefore, how to recycle these valuable metals efficiently has become a concern of significant economic, health and ecological, importance.

It is usually not easy to achieve high recovery of valuable metals (i.e., cobalt, lithium, nickel, manganese, copper, aluminum, and iron) from LIBs.

There is a need for an efficient method to recover valuable metals from spent LIBs. Recycling of spent LIBs enhances environmental protection and enhances a circular economy by separating the valuable metallic constituents into different products.

SUMMARY OF THE INVENTION

In some embodiments this invention provides a method for recovering valuable metals from spent lithium ion batteries, the method comprises:
- a) opening a spent lithium ion battery (LIB), and remove its cover;

- b) grinding the remaining spent LIB at predetermined temperature to obtain a particulate spent lithium ion batteries material including particles having a predetermined grain size;
- c) separating from said particulate spent lithium ion batteries material any plastic and Teflon matrix;
- d) treating said separated particulate spent lithium ion batteries material with $CO_2/CO/H_2O$ gas mixture, reducing gas comprising $CH_4$, solid carbon or combination thereof at predetermined temperature for carbonation of the lithium to obtain a particulate spent lithium ion batteries material comprising lithium carbonate;
- e) treating said particulate spent lithium ion batteries material comprising lithium carbonate with cold water and optionally with additional $CO_2$;
- f) filtering the slurry obtained in step (e) to obtain a lithium carbonate filtrate and a residue comprising cobalt, iron, other valuable metals, and non-metal impurities;
- g) heating said lithium carbonate filtrate at predetermined temperature to lithium carbonate precipitate sedimentation followed by filtration to obtain lithium carbonate precipitate and a mother liquid; and
- h) treating said residue comprising cobalt, iron, other valuable metals, and non-metal impurities of step (f) with a flux at predetermined temperature to obtain valuable metallic ingots.

In some embodiments, the treatment of the separated particulate spent lithium ion batteries material of step (b) is conducted in the presence of a reducing gas comprising $CH_4$. In another embodiment, the reducing gas comprising $CH_4$ comprises $CH_4$ (gas), $CH_4$/air gas mixture or $CH_4/N_2$ gas mixture.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
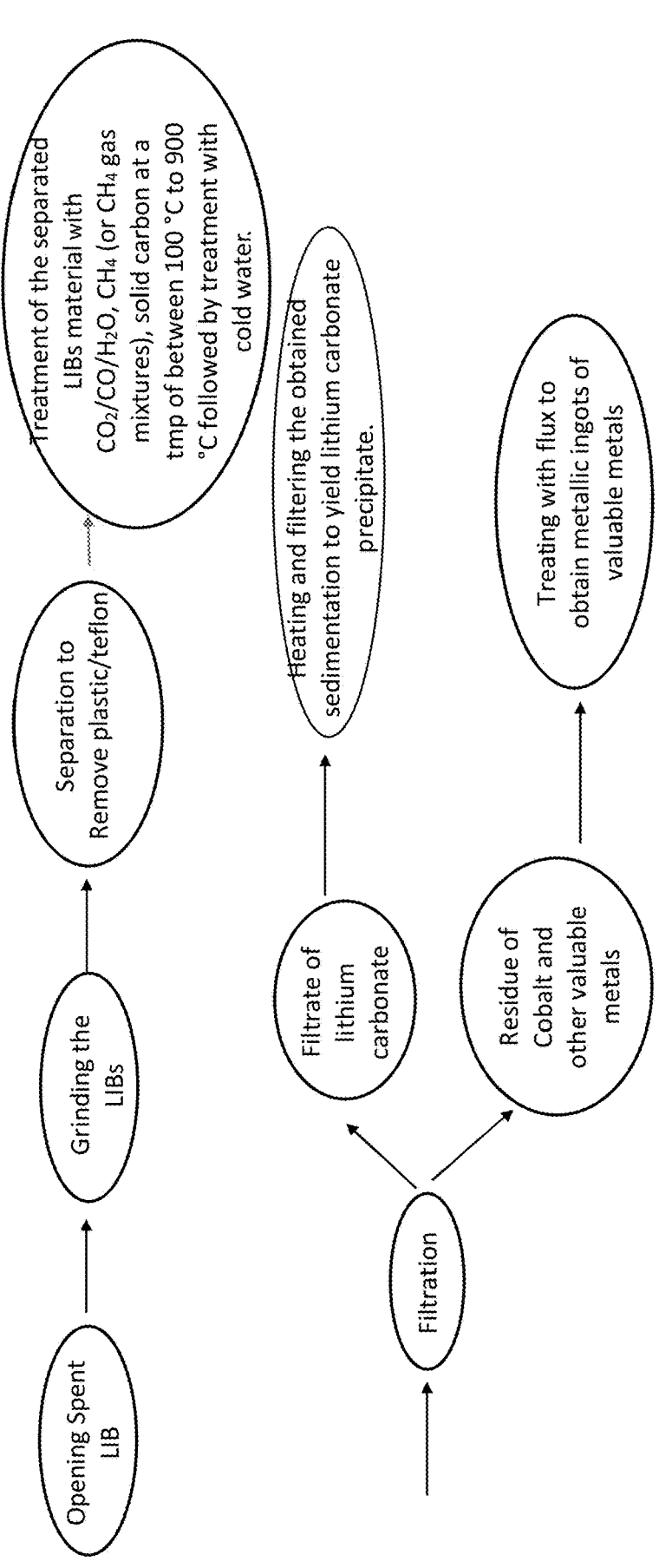
FIG. 1 presents a schematic method step for recovering valuable metals from spent lithium ion batteries.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, this invention provides a method for recovering valuable metals from spent lithium ion batteries, the method comprises:

a) opening a spent lithium ion battery (LIB), and remove its cover;

b) grinding the remaining spent LIB at predetermined temperature to obtain a particulate spent lithium ion batteries material including particles having a predetermined grain size;

c) separating from said particulate spent lithium ion batteries material any plastic and Teflon matrix;

d) treating said separated particulate spent lithium ion batteries material with $CO_2/CO/H_2O$ gas mixture, reducing gas comprising $CH_4$, solid carbon or combination thereof at predetermined temperature for carbonation of the lithium to obtain a particulate spent lithium ion batteries material comprising lithium carbonate;

e) treating said particulate spent lithium ion batteries material comprising lithium carbonate with cold water and optionally with additional $CO_2$;

f) filtering the slurry obtained in step (e) to obtain a lithium carbonate filtrate and a residue comprising cobalt, iron, other valuable metals, and non-metal impurities;

g) heating said lithium carbonate filtrate at predetermined temperature to lithium carbonate precipitate sedimentation followed by filtration to obtain lithium carbonate precipitate and a mother liquid; and h) treating said residue comprising cobalt, iron, other valuable metals, and non-metal impurities of step (f) with a flux at predetermined temperature to obtain valuable metallic ingots.

In one embodiment, this invention provides a method for recovering valuable metals from spent lithium ion batteries, the method comprises:

a) opening a spent lithium ion battery (LIB), and remove its cover;

b) grinding the remaining spent LIB at predetermined temperature to obtain a particulate spent lithium ion batteries material including particles having a predetermined grain size;

c) separating from said particulate spent lithium ion batteries material any plastic and Teflon matrix;

d) treating said separated particulate spent lithium ion batteries material with reducing gas comprising $CH_4$, at predetermined temperature for carbonation of the lithium to obtain a particulate spent lithium ion batteries material comprising lithium carbonate;

e) treating said particulate spent lithium ion batteries material comprising lithium carbonate with cold water and optionally with additional $CO_2$;

f) filtering the slurry obtained in step (e) to obtain a lithium carbonate filtrate and a residue comprising cobalt, iron, other valuable metals, and non-metal impurities;

g) heating said lithium carbonate filtrate at predetermined temperature to lithium carbonate precipitate sedimentation followed by filtration to obtain lithium carbonate precipitate and a mother liquid; and h) treating said residue comprising cobalt, iron, other valuable metals, and non-metal impurities of step (f) with a flux at predetermined temperature to obtain valuable metallic ingots.

In another embodiment, the reducing gas comprising $CH_4$ comprises $CH_4$ (gas), $CH_4$/air gas mixture or $CH_4/N_2$ gas mixture.

The use of $CH_4$ (natural gas) over solid reducing agents has an economic and an environmental advantage: $CH_4$ is the cheapest type of reducing agent, it has a high calorific value, $CH_4$ is the cleanest fuel, reduction reactions with natural gas proceed faster than when using a solid reducing agent, $CH_4$ is easily transported through gas pipelines.

Natural gas sintering under reducing conditions, followed by ice-water leaching, is used to efficiently separate lithium from the heavy metals in the form of lithium carbonate at high yield. Heating of the filter cake in a closed ceramic crucible, with sodium tetraborate as flux, allows recovery of the heavy non-ferrous (Ni, Co, Cu) metals as ingots. Neither corrosive acids nor costly reagents are required and hazardous liquid waste is not generated.

In one embodiment, "spent LIB" refers herein to used/exhausted lithium ion battery mainly comprising a metallic shell, membrane separator, cathode materials ($LiCoO_2$, $LiMn_2O_4$, $LiFePO_4$, $Li_4Ti_5O_{12}$, $LiNi_{0.3}Al_{0.3}Co_{0.3}O_2$, as well as other lithium metal oxides), aluminum foil, anode materials (graphite), copper foil, and organic electrolytes.

This invention provides a method for recovering and/or recycling valuable metals from lithium-ion-batteries. Such valuable metals may include Cobalt, Nickel, Manganese, Copper, Aluminum, Iron, Titanium, Tin, Lead, Zinc, Sodium, calcium. Non-limited examples of the valuable chemical components (including valuable metals) obtained by the method and system of this invention include: $Li_2CO_3$, Co, $TiO_2$, Cu, alumina, iron oxide, sodium oxide, calcium oxide.

The term "other valuable metals" refers herein to at least one of Nickel, Manganese, Copper, Aluminum, Titanium, Tin, Lead, Zinc, Sodium or calcium.

The "valuable metals" and/or "the other valuable metals" are obtained as metallic ingots and can be used as raw material for other products. The "valuable metals" disclosed herein include "the other valuable metals" disclosed herein.

In one embodiment, the method for recovering valuable metals from spent lithium ion batteries includes opening the lithium ion battery and removing the coating layer or shell of the battery wherein the gases disclosed therein are removed. The remaining spent LIB is being further used in the method of this invention.

The opening of a LIB is done by any known technique known in the art such as described in Zheng X. *A Mini-*

5

*Review on Metal Recycling from Spent Lithium Ion Batteries.* Engineering, 2018, 4, 3, 361-370; and Meshram P. *Extraction of lithium from primary and secondary sources by pre-treatment, leaching and separation: A comprehensive review.* Hydrometallurgy, 2014, 150, 12, 192-208, which are incorporated herein by reference.

In some embodiments, the methods of this invention comprise grinding the remaining spent lithium-ion-batteries (LIBs) at predetermined temperature to obtain a particulate spent lithium ion batteries material. In other embodiments, the predetermined temperature used in the grinding step is between 20-50° C. In other embodiments, the particulate spent lithium ion batteries material have a grain size of between 2-10 mm. In another embodiment, between 2-5 mm. In another embodiment between 4-10 mm.

In some embodiments, the methods of this invention comprise separating from the particulate spent lithium ion batteries material any plastic and Teflon matrix. In another embodiment the separation is done by air, wherein the separation is based on different gravity of the material. In another embodiment, the separation is done by any other method known in the art such as described in Peukert W. *Industrial separation of fine particles with difficult dust properties.* Powder Technology, 2001, 118, 1-2, 8, 136-148, which is incorporated herein by reference.

In some embodiments, this invention provides a method for recovering valuable metals from spent lithium ion batteries, the method comprises treating the separated particulate spent lithium ion batteries material with $CO_2/CO/H_2O$ gas mixture, reducing gas comprising $CH_4$, solid carbon or combination thereof at predetermined temperature for carbonation of the lithium to obtain a particulate spent lithium ion batteries material comprising lithium carbonate. A $CO_2/CO/H_2O$ gas mixture refers herein to a mixture of $CO_2$ (g), CO (g) and $H_2O$ (g). Reducing gas comprising $CH_4$ refers herein to $CH_4$/air gas mixture, a mixture of $CH_4$ in the presence of air. or to a $CH_4/N_2$ gas mixture, a mixture of $CH_4$ in the presence of nitrogen gas ($N_2$); or to pure $CH_4$ gas.

In some embodiment the methods of this invention comprise treating the separated particulate spent lithium ion batteries material with $CO_2/CO/H_2O$ gas mixture, reducing gas comprising $CH_4$, solid carbon or combination thereof at predetermined temperature for carbonation of the lithium to obtain a particulate spent lithium ion batteries material comprising lithium carbonate. In other embodiments, the treatment is carried out at a temperature of between 100° C. to 900° C. In other embodiments, at a temperature of between 100° C. to 300° C. In another embodiment, at a temperature of between 100° C. to 200° C. In another embodiment, at a temperature of between 150° C. to 300° C. In another embodiment, at a temperature of between 150° C. to 250° C. In other embodiments, at a temperature of between 100° C. to 500° C. In other embodiments, at temperature of between 600° C. to 900° C. In other embodiments, at temperature of between 200° C. to 800° C. In other embodiments, at temperature of between 100° C. to 700° C. In other embodiments, at temperature of between 400° C. to 900° C. In other embodiments, at temperature of between 650° C. to 850° C. In other embodiments, at temperature of between 700° C. to 900° C. In other embodiments, at temperature of between 600° C. to 700° C. In other embodiments, at temperature of between 700° C. to 800° C. In other embodiments, at temperature of between 800° C. to 900° C. In another embodiment, the reducing gas comprising $CH_4$ comprises $CH_4$ (gas), $CH_4$/air gas mixture or $CH_4/N_2$ gas mixture.

In some embodiment the methods of this invention comprise treating the separated particulate spent lithium ion batteries material with $CO_2/CO/H_2O$ gas mixture at predetermined temperature for carbonation of the lithium to obtain a particulate spent lithium ion batteries material comprising lithium carbonate. In other embodiments, the treatment is carried out at a temperature of between 100° C. to 300° C. In another embodiment, at a temperature of between 100° C. to 200° C. In another embodiment, at a temperature of between 150° C. to 300° C. In another embodiment, at a temperature of between 150° C. to 250° C.

In some embodiment the methods of this invention comprise treating the separated particulate spent lithium ion batteries material with reducing gas comprising $CH_4$ at predetermined temperature for carbonation of the lithium to obtain a particulate spent lithium ion batteries material comprising lithium carbonate. In other embodiments, the treatment is carried out at a temperature of between 100° C. to 900° C. In other embodiments, at a temperature of between 100° C. to 300° C. In another embodiment, at a temperature of between 100° C. to 200° C. In another embodiment, at a temperature of between 150° C. to 300° C. In another embodiment, at a temperature of between 150° C. to 250° C. In other embodiments, at a temperature of between 100° C. to 500° C. In other embodiments, at temperature of between 600° C. to 900° C. In other embodiments, at temperature of between 400° C. to 900° C. In other embodiments, at temperature of between 200° C. to 800° C. In other embodiments, at temperature of between 100° C. to 700° C. In other embodiments, at temperature of between 650° C. to 850° C. In other embodiments, at temperature of between 700° C. to 900° C. In other embodiments, at temperature of between 600° C. to 700° C. In other embodiments, at temperature of between 700° C. to 800° C. In other embodiments, at temperature of between 800° C. to 900° C. In another embodiment, the reducing gas comprising $CH_4$ comprises $CH_4$ (gas), CHA/air gas mixture or $CH_4/N_2$ gas mixture.

In some embodiment the methods of this invention comprise treating the separated particulate spent lithium ion batteries material with solid carbon at predetermined temperature for carbonation of the lithium to obtain a particulate spent lithium ion batteries material comprising lithium carbonate. In other embodiments, the treatment is carried out at a temperature of between 600° C. to 900° C. In other embodiments, at temperature of between 650° C. to 850° C. In other embodiments, at temperature of between 700° C. to 900° C. In other embodiments, at temperature of between 600° C. to 700° C. In other embodiments, at temperature of between 700° C. to 800° C. In other embodiments, at temperature of between 800° C. to 900° C.

In some embodiment, the $CO_2/CO/H_2O$ gas mixture used in the method and system of this invention includes a partial pressure of $CO_2/CO$ of between from 0.1 to 100. In another embodiment a partial pressure of $CO_2/CO$ of between 0.1 to 20. In another embodiment a partial pressure of $CO_2/CO$ of between 0.1 to 30. In another embodiment a partial pressure of $CO_2/CO$ of between 10 to 50. In another embodiment a partial pressure of $CO_2/CO$ of between 1 to 30. In another embodiment a partial pressure of $CO_2/CO$ of between 50 to 100. In another embodiment between 30 to 100.

In some embodiment, the $CO_2/CO/H_2O$ mixture used in the method and system of this invention includes a partial pressure of $H_2O$ of between 0.1% to 50% v/v. In another embodiment a partial pressure of $H_2O$ of between 10% to 50% v/v. In another embodiment a partial pressure of $H_2O$ of between 1% to 30% v/v. In another embodiment a partial pressure of $H_2O$ of between 20% to 50% v/v. In another embodiment a partial pressure of $H_2O$ of between 0.1% to 10% v/v.

In some embodiment, the $CH_4$/air gas mixture used in the method and system of this invention includes a partial pressure of $CH_4$ of between 0.1% to 100% v/v. In another embodiment a partial pressure of $CH_4$ of between 0.1% to 50% v/v. In another embodiment a partial pressure of $CH_4$ of between 1% to 10% v/v. In another embodiment a partial pressure of $CH_4$ of between 3% to 6% v/v. In another embodiment a partial pressure of $CH_4$ of between 10% to 50% v/v. In another embodiment a partial pressure of $CH_4$ of between 1% to 30% v/v. In another embodiment a partial pressure of $CH_4$ of between 20% to 50% v/v. In another embodiment a partial pressure of $CH_4$ of between 0.1% to 10% v/v. In another embodiment a partial pressure of $CH_4$ of between 30% to 100% v/v. In another embodiment a partial pressure of $CH_4$ of between 50% to 100% v/v. In another embodiment, the $CH_4$ is pure gas.

In some embodiment, the $CH_4$/$N_2$ gas mixture used in the method and system of this invention includes a partial pressure of $CH_4$ of between 0.1% to 100% v/v. In another embodiment a partial pressure of $CH_4$ of between 0.1% to 50% v/v. In another embodiment a partial pressure of $CH_4$ of between 1% to 10% v/v. In another embodiment a partial pressure of $CH_4$ of between 3% to 6% v/v. In another embodiment a partial pressure of $CH_4$ of between 10% to 50% v/v. In another embodiment a partial pressure of $CH_4$ of between 1% to 30% v/v. In another embodiment a partial pressure of $CH_4$ of between 20% to 50% v/v. In another embodiment a partial pressure of $CH_4$ of between 0.1% to 10% v/v. In another embodiment a partial pressure of $CH_4$ of between 30% to 100% v/v. In another embodiment a partial pressure of $CH_4$ of between 50% to 100% v/v.

In some embodiments, the weight ratio between the carbon used in the method and system of this invention to the separated particulate spent lithium ion batteries material is from 10:100 to 200:100. In another embodiment, the weight ratio is from 50:100 to 200:100. In another embodiment, the weight ratio is from 100:100 to 200:100. In another embodiment, the weight ratio is from 150:100 to 200:100. In another embodiment, the weight ratio is from 10:100 to 100:100. In another embodiment, the weight ratio is from 50:100 to 150:100. In another embodiment, the weight ratio is from 50:100 to 100:100. In another embodiment, the weight ratio is from 70:100 to 100:100. In another embodiment, the weight ratio is from 50:100 to 80:100.

In some embodiments, the method and system of this invention provide lithium extraction. In another embodiment, the yield of the lithium extraction is between 85-100%. In another embodiment, is between 90-100%.

In some embodiments, the method and system of this invention, wherein the method comprises a treatment with reducing gas comprising $CH_4$ provides lithium extraction. In another embodiment, the yield of the lithium extraction is between 90-100%.

In some embodiments, the method and system of this invention, wherein the method comprises a treatment with $CO_2$/CO/$H_2O$ mixture provides lithium extraction. In another embodiment, the yield of the lithium extraction is between 90-100%.

In some embodiments, the method and system of this invention which comprises solid carbon provide lithium extraction. In another embodiment, the yield of the lithium extraction is between 90-100%.

In some embodiments, the method and system of this invention which comprises solid carbon provide non-ferrous metals extraction. In another embodiment, the yield of the non-ferrous metal extraction is above 99%. In another embodiment, the yield of the Non-ferrous metal extraction is above 99.2%.

In some embodiment, the solid carbon used in the method and system of this invention for recovering valuable metals from spent lithium ion batteries, comprises coal, coke, charcoal, graphite, or any combination thereof.

In another embodiment, the solid carbon is coal. In another embodiment, the solid carbon is coke. In another embodiment, the solid carbon is charcoal. In another embodiment, the solid carbon is graphite.

In some embodiment, following the treatment with $CO_2$/CO/$H_2O$ mixture the particulate spent lithium ion batteries material comprising lithium carbonate is treated with cold water followed by additional $CO_2$. In some embodiment, following the treatment with $CO_2$/CO/$H_2O$ mixture the particulate spent lithium ion batteries material comprising lithium carbonate is treated only with cold water. Li2CO3 is soluble in the pure cold water. The addition of $CO_2$ is used to dissolve the resulting lithium carbonate and purify it.

In some embodiment, following the treatment with a reducing gas comprising $CH_4$ the particulate spent lithium ion batteries material comprising lithium carbonate is treated with cold water. In another embodiment, the reducing gas comprising $CH_4$ comprises $CH_4$ (gas), $CH_4$/air gas mixture or $CH_4$/$N_2$ gas mixture.

In some embodiment, following the treatment with a solid carbon the particulate spent lithium ion batteries material comprising lithium carbonate is treated with cold water.

In some embodiment, following the treatment with $CO_2$/CO/$H_2O$, or a reducing gas comprising $CH_4$, or solid carbon or combination thereof at predetermined temperature for carbonation of the lithium to obtain a particulate spent lithium ion batteries material comprising lithium carbonate; the particulate spent lithium ion batteries material comprising lithium carbonate is treated with cold water at a weight ratio of solid (spent Li/liquid (water) 1:10-30 w/w. In another embodiment in a ratio of 1:10, 1:20, 1:30.

The solubility of the $Li_2CO_3$ in the cold water is high. For example, at 25° C., the solubility of $Li_2CO_3$ is much higher than that of the d-metals, i.e. ~12.9 gm/L (cf. solubility of $NiCO_3$, 0.093 gm/L). However, the solubility of $Li_2CO_3$ falls to 6.9 gm/L at 100° C.

In some embodiments, the treatment of the separated particulate spent lithium ion batteries material with a $CO_2$/CO/$H_2O$ mixture or with a reducing gas comprising $CH_4$ ($CH_4$, $CH_4$/air) at the predetermined temperature results in a carbonation reaction to yield particulate spent lithium ion batteries material comprising lithium carbonate.

The following are possible carbonation reactions which occur:

$$Li_4Ti_5O_{12}+CO_2+CO+H_2O \rightarrow 2Li_2CO_3+5TiO_2 \quad (1)$$

$$4LiCoO_2+CO_2+CO+H_2O \rightarrow 2Li_2CO_3+4Co \quad (2)$$

$$2LiFePO_4+CO_2+CO+H_2O \rightarrow LiHCO_3+FeHPO_4 \quad (3)$$

$$Li_3PO_4+CO_2+CO+H_2O \rightarrow LiHCO_3+LiH_2PO_4 \quad (4)$$

$$LiCoO_2+0.5CH_4\,(g)+0.25\,O_2\,(g)=>0.5Li_2CO_3+Co+H_2O\,(g) \quad (5)$$

$$LiCoO_2+\tfrac{3}{8}CH_4\,(g)+\tfrac{1}{8}CO_2\,(g)=>0.5Li_2CO_3+Co+\tfrac{3}{4}H_2O\,(g) \quad (6)$$

$$2LiFePO_4+CH_4\,(g)+2.5O_2\,(g)=>Li_2CO_3+Fe_2O_3+P_2O_5\,(g)+2H_2O\,(g) \quad (7)$$

$$Li_2TiO_3+CH_4\text{ (g)}+2O_2\text{ (g)}=>Li_2CO_3+TiO_2+2H_2O\text{ (g)} \qquad (8)$$

$$LiNi_{0.3}Mn_{0.3}Co_{0.3}O_2+CH_4\text{ (g)}=>0.3Li_2CO_3+0.3Co+\\0.3Ni+0.3Mn_2O_3+H_2O\text{ (g)} \qquad (9)$$

In some embodiments, the treatment of the separated particulate spent lithium ion batteries material with a solid carbon at the predetermined temperature results in a carbonation reaction to yield particulate spent lithium ion batteries material comprising lithium carbonate.

The following are possible carbonation reactions which occur when using solid carbon:

$$LiFePO_4+C+O_2=>Li_2CO_3+FePO_4+CO \qquad (10)$$

$$LiCoO_2+C=>Li_2CO_3+CO+Co \qquad (11)$$

$$LiFePO_4+C=>Li_2CO_3+FePO_4 \qquad (12)$$

$$LiNi_{0.3}Mn_{0.3}Co_{0.3}O_2+0.3C=>0.3Li_2CO_3+0.3Co+\\0.3Ni+0.3Mn_2O_3 \qquad (13)$$

$$LiNi_{0.3}Al_{0.3}Co_{0.3}O_2+C=>Li_2CO_3+Co+Ni+Al_2O_3 \qquad (14)$$

$$LiNi_{0.3}Mn_{0.3}Co_{0.3}O_2+C=>Li_2CO_3+CoO+NiO+\\Mn_2O_3 \qquad (15)$$

$$LiNi_{0.3}Al_{0.3}Co_{0.3}O_2+C=>5Li_2CO_3+CoO+NiO+Al_2O_3 \qquad (16)$$

Following the treatment of cold water (following the treatment with $CO_2/CO/H_2O$, a reducing gas comprising $CH_4$ or solid carbon), a slurry is obtained which is filtered to obtain a lithium carbonate filtrate and a residue containing cobalt, iron, other valuable metals, and non-metal impurities. In some embodiments, other valuable metals include, Nickel, Manganese, Copper, Aluminum (i.e. alumina), Iron (i.e. iron oxide), Titanium, Tin, Lead, Zinc, Sodium (i.e. sodium oxide), calcium (i.e. calcium oxide) or combination thereof. In another embodiment, the Aluminum is alumina. In another embodiment, the Iron is iron oxide. In another embodiment, the Sodium is sodium oxide. In another embodiment, the calcium is calcium oxide.

In other embodiment, the non-metal impurities comprise organic binders, hard carbon, plastic case, polymer foil & electrolyte, silica or combination thereof.

In some embodiment the lithium carbonate filtrate is heated at a predetermined temperature to obtain lithium carbonate precipitate sedimentation followed by filtration to obtain lithium carbonate precipitate and a mother liquid.

In another embodiment, the lithium carbonate filtrate is heated to a temperature of between 80° C. to 120° C. In another embodiment to a temperature of between 80° C. to 100° C. In another embodiment to a temperature of between 80° C. to 90° C. In another embodiment to a temperature of between 90° C. to 120° C. In another embodiment to a temperature of between 100° C. to 120° C.

In some embodiment, the lithium carbonate precipitate is further dried to obtain a dry lithium carbonate powder. In other embodiments, the lithium carbonate precipitate or the lithium carbonate powder prepared by the method of this invention is further used as a raw material in the field of ceramics, glass and batteries.

Lithium carbonate is used in the production of ceramics and glass, and of lithium ion batteries. Lithium carbonate is a common ingredient in both low-fire and high-fire ceramic glaze. It forms low-melting fluxes with silica and other materials. Glasses derived from lithium carbonate are useful in ovenware.

In some embodiment, the residue containing cobalt, iron, other valuable metal, and non-metal impurities obtained following the filtration of the slurry is treated with a flux for smelting the valuable metal at predetermined temperature to obtain a metallic ingots. In another embodiment, the flux comprises silica, carbon, calcium oxide, sodium oxide, sodium tetraborate (Borax), alumina, iron oxide, or combination thereof.

Flux is a chemical cleaning agent, flowing agent, or purifying agent. They are used in both extractive metallurgy and metal joining.

In some embodiments, the flux is used in an amount of between 100-300% by weight of the cake material. In other embodiments, the flux is used in an amount of 100%, 200%, 300% by weight of the cake material.

In the process of smelting fluxes added to the contents of a smelting furnace or a cupola for the purpose of purging the metal of chemical impurities and of rendering slag more liquid at the smelting temperature. The slag is a liquid mixture of ash, flux, and other impurities.

The role of a flux is typically dual: dissolving the oxides already present on the metal surface, which facilitates wetting by molten metal, and acting as an oxygen barrier by coating the hot surface, preventing its oxidation.

In another embodiment, the metallic ingots comprise non-ferrous metals selected from Cobalt, Nickel, Manganese, Copper, Aluminum, Titanium, Tin, Lead, Zinc, Sodium, calcium and combination thereof or iron ingots.

In another embodiment, the Aluminum is alumina. In another embodiment, the Sodium is sodium oxide. In another embodiment, the calcium is calcium oxide.

In another embodiment, the treatment with the flux is carried out at a temperature of between 1200° C. to 2000° C. In another embodiment, the treatment with the flux is carried out at a temperature of between 1200° C. to 1500° C. In another embodiment, the treatment with the flux is carried out at a temperature of between 1400° C. to 1700° C. In another embodiment, the treatment with the flux is carried out at a temperature of between 1200° C. to 1300° C. In another embodiment, the treatment with the flux is carried out at a temperature of between 1300° C. to 1400° C. In another embodiment, the treatment with the flux is carried out at a temperature of between 1300° C. to 1500° C. In another embodiment, the treatment with the flux is carried out at a temperature of between 1400° C. to 1500° C.

In some embodiments, the metallic ingot prepared by the method of this invention is used as a raw material metal production and as a dopant in various alloys.

In other embodiments the "metallic ingot" includes/refers to herein to non-ferrous metals selected from Cobalt, Nickel, Manganese, Copper, Aluminum (i.e. alumina), Titanium, Tin, Lead, Zinc, Sodium (i.e. sodium oxide), calcium (i.e. calcium oxide) and combination thereof or iron ingots. In another embodiment, the Aluminum is alumina. In another embodiment, the Sodium is sodium oxide. In another embodiment, the calcium is calcium oxide.

In some embodiments the recycling method for Lithium-ion batteries provided herein, containing Lithium-Cobalt Oxide ($LiCoO_2$), and Lithium-Nickel-Cobalt-Aluminum Oxide (NCA) as cathode material, does not use aggressive acids and expensive reagents and does not generate hazardous liquid waste. Heavy non-ferrous metals (Ni, Co, Cu) was received in the metallic form. If needed for copper extraction from nickel and cobalt mixture, it is necessary to use magnetic separation of the filtration cake after leaching.

In some embodiments, this invention provides a system for use in recovering valuable metals from spent lithium ion batteries, wherein the system comprises:

a reaction chamber comprising a sample, a furnace for heating the sample, a $CO_2$ cylinder, a CO cylinder and a water vapor generator; and/or a $CH_4$ or $CH_4$/air or $CH_4$/$N_2$ cylinder; and wherein the sample comprises a separated particulate spent lithium ion batteries material as described in the methods of this invention and wherein the $CO_2$, CO and the water vapor or the $CH_4$ are fed into the reaction chamber, for treating the particulate spent lithium ion batteries material to yield a particulate spent lithium ion batteries material comprising lithium carbonate.

In some embodiments, this invention provides a system for use in recovering valuable metals from spent lithium ion batteries, wherein the system comprises:

a reaction chamber comprising a solid carbon and the sample, a furnace for heating the sample, wherein the sample comprises a separated particulate spent lithium ion batteries material as described in the methods of this invention and wherein a solid carbon and the sample are heated to a temperature of between 600-900° C. for to yield a particulate spent lithium ion batteries material comprising lithium carbonate.

In other embodiments, the system of this invention comprises a sample, wherein the sample comprises a separated particulate spent lithium ion batteries material. In another embodiment, the separated particulate spent lithium ion batteries material is prepared by grinding a spent LIBs at predetermined temperature to obtain a particulate spent lithium ion batteries material including particles having a predetermined grain size; and separating from said particulate spent lithium ion batteries material any plastic and Teflon matrix.

Figure 2:
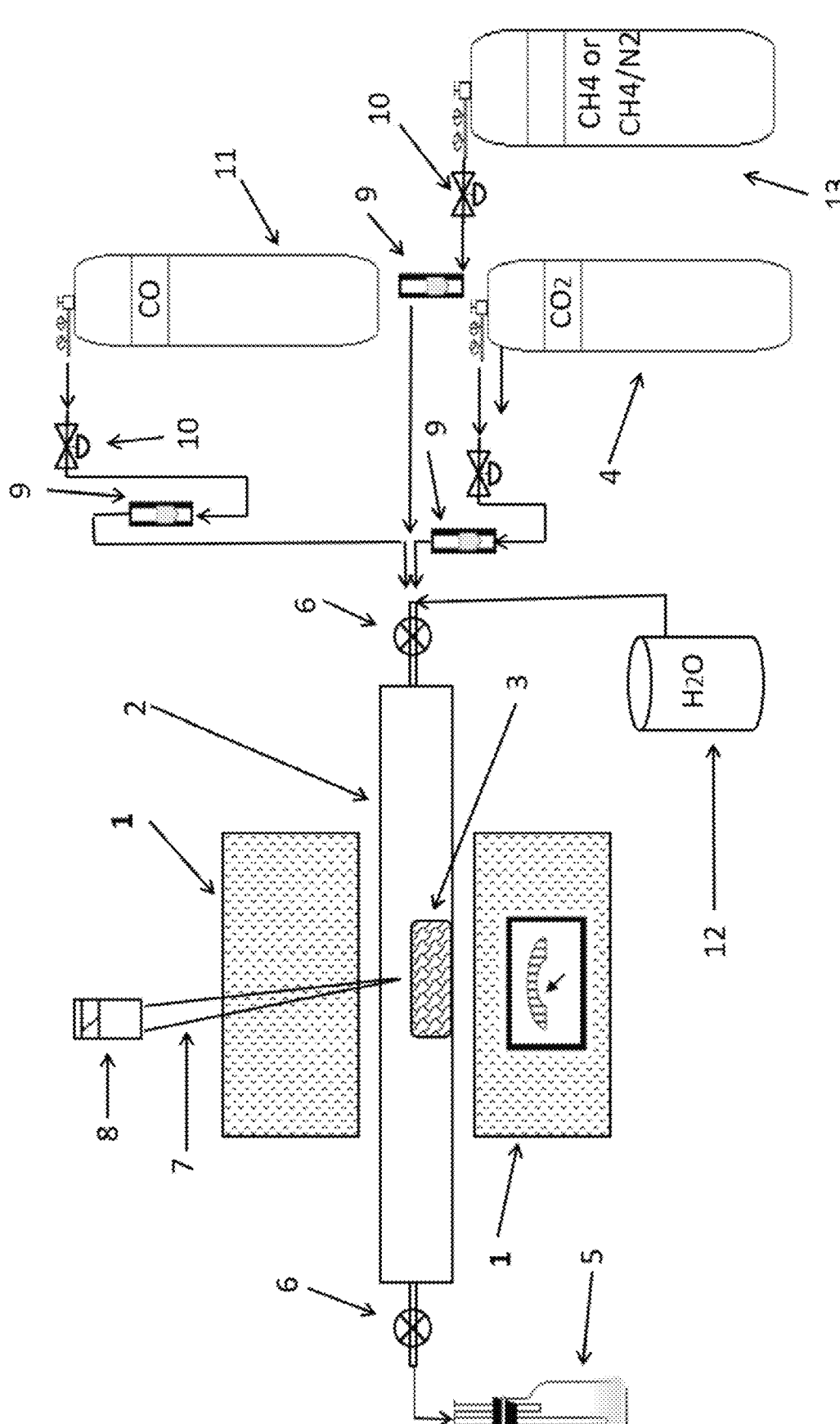
FIG. 2 presents a schematic illustration of one embodiment of a system (a laboratory setup) of this invention 1—furnace with temperature controller, 2—reaction chamber (pyrex), 3—sample or sample with solid carbon, 4—$CO_2$ cylinder, 5—gas cleaning bottle, 6—gas sampler for GC analysis, 7—thermocouple, 8—additional temperature monitor, 9—flowmeter, 10—valve, 11—CO cylinder, 12—water vapor generator, 13—reducing gas comprising $CH_4$ such as $CH_4/N_2$, $CH_4$/air or $CH_4$ cylinder.

In some embodiment, the system is as described in FIG. 2.

FIG. 2 is a schematic illustration of a system, according to some embodiments of the invention. FIG. 2 illustrates schematically a system for use in recovering valuable metals from spent lithium ion batteries, in a non-limiting manner, a furnace with temperature control 1 which is in contact with the reaction chamber 2. The reaction chamber includes the sample 3 (and optionally solid carbon). The sample includes a separated particulate spent lithium ion batteries material as described in the methods of this invention. The sample is treated with a $CO_2$/CO/$H_2O$ mixture, wherein the $CO_2$ cylinder 4, CO cylinder 11, a reducing gas comprising $CH_4$ such as $CH_4$/$N_2$, $CH_4$/air or $CH_4$ cylinder 13 and the water vapor generator 12 are connected to the reaction chamber and feed the sample with a $CO_2$/CO/$H_2O$ or a reducing gas comprising $CH_4$. The system further comprises a gas cleaning bottle 5 for the neutralization of the gases which is connected to the reaction chamber; a gas sampler for GC analysis 6 for the gas mixtures which is connected to the gas cleaning bottle 5; a thermocouple 7 which is attached to the sample to measure its temperature; optionally additional temperature monitor 8 attached to the sample to measure its temperature; a flowmeter 9, connected to the CO and $CO_2$ cylinders to determine their partial pressure to be used; and valves 10, connected to the CO and $CO_2$ cylinders before each flowmeter 9, to determine the flow of the gas.

The furnace with temperature control 1 which is in contact with the reaction chamber 2 is configured to heat the reaction chamber to a temperature of between 100° C. to 900° C. In another embodiment, at a temperature of between 100° C. to 200° C. In another embodiment, at a temperature of between 100° C. to 300° C. In another embodiment, at a temperature of between 150° C. to 300° C. In another embodiment, at a temperature of between 150° C. to 250° C. In another embodiment for treatment with the $CH_4$/air mixture and solid carbon a temperature of between 600° C. to 900° C.

In some embodiment this invention provides a method for recovering valuable metals from spent lithium ion batteries using the system of this invention.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

EXAMPLES

Example 1

Carbonation of Lithium with Gas Mixtures of $CO_2$/CO/$H_2O$ or $CH_4$/Air

Carbonation tests with gas mixtures of $CO_2$/CO/$H_2O$ or $CH_4$/air and cold-water treatment of the obtained products were carried out with the lithium-containing components of the rechargeable lithium-ion batteries. Exposure of the lithium-containing components of the rechargeable lithium-ion batteries was carried out at a temperature of 100-900° C.

Materials.

For the experiments, model mixtures consisting of lithium titanate ($Li_4Ti_5O_{12}$), lithium cobalt oxide ($LiCoO_2$), lithium iron phosphate ($LiFePO_4$), lithium nickel manganese cobalt oxide $LiNi_xMn_yCo_zO_2$ (x+y+z=1), lithium nickel cobalt aluminum oxide $LiNi_xCo_yAl_zO_2$ (x+y+z=1) and lithium phosphate ($Li_3PO_4$) were used. These substances are used in various types of rechargeable lithium-ion batteries as cathodes or anodes.

Experimental Procedure.

Carbonation of model mixtures with $CO_2$/CO/$H_2O$ or $CH_4$/air gas mixture were carried out in a temperature-controlled laboratory furnace at 100-900° C.: test duration was 2 hour. The laboratory setup is described in FIG. 2.

Powder of the model mixtures was placed in the furnace in a or quarts boat. Prior to heating, the quartz reactor was cleaned under 100 ml/min nitrogen flow, following which the furnace was heated to a given temperature, again under 100 ml/min nitrogen flow. $CO_2$/CO/$H_2O$ or $CH_4$/air gas mixture was fed into the reactor after the latter had reached the designated temperature. Possible chemical reactions that occur during carbonation of said separated particulate spent lithium ion batteries material at predetermined temperature.

$$Li_4Ti_5O_{12}+CO_2+CO+H_2O \rightarrow 2Li_2CO_3+5TiO_2 \qquad (1)$$

$$4LiCoO_2+CO_2+CO+H_2O \rightarrow 2Li_2CO_3+4Co \qquad (2)$$

$$2LiFePO_4+CO_2+CO+H_2O \rightarrow LiHCO_3+FeHPO_4 \qquad (3)$$

$$Li_3PO_4+CO_2+CO+H_2O \rightarrow LiHCO_3+LiH_2PO_4 \qquad (4)$$

$$LiCoO_2+0.5CH_4\ (g)+0.25\ O_2\ (g) => 0.5Li_2CO_3+Co+H_2O\ (g) \qquad (5)$$

$$LiCoO_2+\tfrac{3}{8}CH_4\ (g)+\tfrac{1}{8}CO_2\ (g) => 0.5Li_2CO_3+Co+\tfrac{3}{4}H_2O\ (g) \qquad (6)$$

$$2LiFePO_4+CH_4\ (g)+2.5O_2\ (g) => Li_2CO_3+Fe_2O_3+P_2O_5\ (g)+2H_2O\ (g) \qquad (7)$$

$$Li_2TiO_3+CH_4 \text{ (g)}+2O_2 \text{ (g)}=>Li_2CO_3+TiO_2+2H_2O \text{ (g)} \quad (8)$$

$$LiNi_{0.3}Mn_{0.3}Co_{0.3}O_2+CH_4 \text{ (g)}=>0.3Li_2CO_3+0.3Co+0.3Ni+0.3Mn_2O_3+H_2O \text{ (g)} \quad (9)$$

After cooling under nitrogen flow, the Pyrex glass boat was removed from the furnace. The final product was weighed, and cold water treated. Thereafter, slurry after treatment was filtered. Filtrate was analyzed with ICP MS. Lithium balances of each test were calculated. Lithium extraction yield to the filtrate was evaluated from each lithium balance.

Results.

Results are presented in the Tables 1, 2.

TABLE 1

Results of the carbonization with
$CO_2/CO/H_2O$ - cold-water treatment tests.

| Mixture | Ratio $CO_2/CO$ | Temperature, C. | Lithium extraction yield, % | Non-ferrous metals extraction yield, % |
|---|---|---|---|---|
| $Li_4Ti_5O_{12}$ | 0.4 | 200 | 93.1 | — |
| | 1.5 | 200 | 94.1 | — |
| | 20.0 | 200 | 97.5 | — |
| $LiCoO_2$ | 0.4 | 200 | 91.2 | — |
| | 1.5 | 200 | 92.9 | — |
| | 20.0 | 200 | 96.3 | — |
| | 0.4 | 700 | 97.3 | 99.2 |
| | 0.4 | 850 | 97.7 | 99.6 |
| $LiFePO_4$ | 0.4 | 200 | 90.8 | — |
| | 1.5 | 200 | 93.1 | — |
| | 20.0 | 200 | 97.3 | — |
| $Li_3PO_4$ | 0.4 | 200 | 94.5 | — |
| | 1.5 | 200 | 96.2 | — |
| | 20.0 | 200 | 98.0 | — |
| $LiNi_xMn_yCo_zO_2$ | 0.4 | 700 | 96.7 | 99.3 |
| | 0.4 | 850 | 97.4 | 99.6 |
| $LiNi_xCo_yAl_zO_2$ | 0.4 | 700 | 96.9 | 99.5 |
| | 0.4 | 850 | 98.2 | 99.8 |
| Mixture 1 | 0.4 | 200 | 90.6 | — |
| | 1.5 | 200 | 95.2 | — |
| | 20.0 | 200 | 97.8 | — |
| Mixture 2 | 0.4 | 200 | 94.1 | — |
| | 1.5 | 200 | 94.9 | — |
| | 20.0 | 200 | 96.9 | — |

Mixture 1: $Li_4Ti_5O_{12}$ - 25%, $LiCoO_2$ - 25%, $LiFePO_4$ - 25%, $Li_3PO_4$ - 25%.
Mixture 2: $Li_4Ti_5O_{12}$ - 20%, $LiCoO_2$ - 40%, $LiFePO_4$ - 20%, $Li_3PO_4$ - 20%.

TABLE 2

Results of the carbonization tests
with CH4 and cold-water treatment.

| Material | Partial pressure $CH_4$/air mixture (%) | Temperature, C. | Lithium extraction yield, % | Non-ferrous metals extraction yield, % |
|---|---|---|---|---|
| $LiCoO_2$ | 10 | 600 | 96.3 | 99.5 |
| | 10 | 900 | 99.1 | 99.5 |
| $LiNi_xMn_yCo_zO_2$ | 10 | 600 | 97.6 | 99.2 |
| | 10 | 900 | 99.2 | 99.3 |
| $LiNi_xCo_yAl_zO_2$ | 10 | 600 | 97.8 | 99.5 |
| | 10 | 900 | 99.2 | 99.8 |

Example 2

Carbonation of Lithium with Solid Carbon

Carbonation tests with solid carbon and cold-water treatment of the obtained products were carried out with the lithium-containing components of the rechargeable lithium-ion batteries. Exposure of the lithium-containing components of the rechargeable lithium-ion batteries was carried out at a temperature of 600-900° C. At temperatures below 600° C., the extraction of lithium and non-ferrous metals (cobalt and nickel) sharply decreases due to a decrease in the carbon reducing ability. At temperatures above 900° C., the material was sintered and the extraction of lithium and non-ferrous metals (cobalt and nickel) sharply decreased due to a decrease of the material porosity.

Materials.

For the experiments, model mixtures consisting lithium cobalt oxide ($LiCoO_2$), lithium iron phosphate ($LiFePO_4$), lithium nickel manganese cobalt oxide $LiNi_xMn_yCo_zO_2$ (x+y+z=1), and lithium nickel cobalt aluminum oxide $LiNi_xCo_yAl_zO_2$ (x+y+z=1) were used. These substances were used in various types of rechargeable lithium-ion batteries as cathodes or anodes.

Experimental Procedure.

Carbonation of model mixtures with solid carbon was carried out in a temperature-controlled laboratory furnace at 600-900° C.: test duration was 2 hours. The laboratory setup is described in FIG. 2.

Powder of the model mixtures with solid carbon was placed in the furnace in a alumina boat. Prior to heating, the quartz reactor was cleaned under 100 ml/min nitrogen flow, following which the furnace was heated to a given temperature, again under 100 ml/min nitrogen flow. Nitrogen was fed into the reactor after the latter had reached the designated temperature. Possible chemical reactions that occur during carbonation of said separated particulate spent lithium ion batteries material at predetermined temperature.

$$LiFePO_4+C+O_2=>Li_2CO_3+FePO_4+CO \quad (10)$$

$$LiCoO_2+C=>Li_2CO_3+CO+Co \quad (11)$$

$$LiFePO_4+C=>Li_2CO_3+FePO_4 \quad (12)$$

$$LiNi_{0.3}Mn_{0.3}Co_{0.3}O_2+0.3C=>0.3Li_2CO_3+0.3Co+0.3Ni+0.3Mn_2O_3 \quad (13)$$

$$LiNi_{0.3}Al_{0.3}Co_{0.3}O_2+C=>Li_2CO_3+Co+Ni+Al_2O_3 \quad (14)$$

$$LiNi_{0.3}Mn_{0.3}Co_{0.3}O_2+C=>Li_2CO_3+CoO+NiO+Mn_2O_3 \quad (15)$$

$$LiNi_{0.3}Al_{0.3}Co_{0.3}O_2+C=>5Li_2CO_3+CoO+NiO+Al_2O_3 \quad (16)$$

After cooling under nitrogen flow, the alumina boat was removed from the furnace. The final product was weighed, and cold water treated. Thereafter, slurry after treatment was filtered. Filtrate and precipitate were analyzed with ICP MS. Lithium, cobalt and nickel balances of each test were calculated. Lithium extraction yield to the filtrate and cobalt and nickel extraction yield to the precipitate were evaluated from each balance.

Results.

Results are presented in the Table 3.

TABLE 3

Results of the carbonization tests with
solid carbon and cold-water treatment

| Material | Weight ratio carbon to separated particulate spent lithium ion batteries material | Temperature, C. | Lithium extraction yield, % | Non-ferrous metals extraction yield, % |
|---|---|---|---|---|
| LiCoO₂ | 50/100 | 600 | 96.1 | 99.4 |
| | 50/100 | 900 | 99.3 | 99.8 |
| | 100/100 | 600 | 96.6 | 99.6 |
| | 100/100 | 900 | 99.4 | 99.8 |
| LiFePO₄ | 50/100 | 600 | 93.2 | — |
| | 50/100 | 900 | 97.5 | — |
| | 100/100 | 600 | 94.6 | — |
| | 100/100 | 900 | 97.5 | — |
| LiNi$_x$Mn$_y$Co$_z$O₂ | 50/100 | 600 | 98.2 | 99.2 |
| | 50/100 | 900 | 99.6 | 99.8 |
| | 100/100 | 600 | 98.4 | 99.5 |
| | 100/100 | 900 | 99.7 | 99.8 |
| LiNi$_x$Co$_y$Al$_z$O₂ | 50/100 | 600 | 97.8 | 99.4 |
| | 50/100 | 900 | 99.2 | 99.7 |
| | 100/100 | 600 | 98.5 | 99.6 |
| | 100/100 | 900 | 99.7 | 99.9 |

Example 3

Carbonation of Lithium with CH₄ Gas Mixture

Materials.

Spent, lithium-ion batteries from a Lenovo laptop computer constituted the starting material. The batteries, which had been discharged during normal use, were opened and the plastic containers were removed by hand. The cylindrical battery elements, including the metal casings, formed the test material.

Natural gas (predominantly, CH₄) was used as the reducing reagent. In the interest of laboratory safety, the natural gas was diluted with nitrogen to 4 vol %. This mixture (below the lower explosive limit), was purchased from Gas Technologies Ltd., Israel (analytical uncertainty ±2%; Airgas Specialty Gas Company, USA). Sodium tetraborate (Borax) was purchased from Holland Moran, Ltd, Israel.

Sample Preparation and Characterization.

The starting battery material was crushed and milled to produce powder with a particle size of <100 mesh (149 μm); no time-consuming separation of the casings, electrodes or electrolytes was attempted. Elemental composition of the material at all stages of the processing was characterized by solution inductively coupled plasma mass spectroscopy (ICP-MS, Agilent Technologies). The ICP-MS measurements required preliminary aqua regia leaching at boiling temperature with continuous stirring during 3 hours. X-ray diffraction (XRD) patterns from the powdered battery samples prior to, and following, reduction sintering, were obtained on an Ultima III theta-theta diffractometer (Rigaku Corporation, Japan). Phase identification was accomplished using Jade Pro (MDI, Cal.) software and the Inorganic Crystal Structure Database (ICSD).

Methods.

Sample Preparation for ICP-MS

The powdered material was weighed and 0.1 gr of the sample was then dissolved in boiling aqua regia (100 ml) and filtered. Compounds of non-ferrous metals dissolve under these conditions, while graphite does not dissolve. After filtration, the solution was diluted with distilled water to 1 liter and the residue (graphite) was discarded. The solution is then analyzed by ICP-MS.

Reduction Sintering with Natural Gas; Ice-Water Leaching

Sintering of 10-20 gr powder was performed in a laboratory reactor at temperatures between 673 K and 1123 K (400° C. to 850° C.). A diagram of the reactor is shown in FIG. 2. Once the desired sintering temperature had been reached, it was held for 60 min. The flow rate of the natural gas/nitrogen mixture was 60 cc/min. In the laboratory experiments, the rest of the natural gas went into the exhaust system. The atmosphere in the reactor was highly reducing. After cooling to ambient temperature, the clinker was removed from the reactor. XRD measurements were made on the clinker after each sintering procedure. A clinker sample which had been sintered at temperature between 673-1123 K (400° C. to 850° C.) was then leached with ice water at a solid/liquid ratio≈(1:20-50) gr/gr. for 40 min in a glass beaker with continuous stirring. Leaching produced a solid cake and a turbid solution which was then filtered (to obtain a lithium carbonate filtrate and a residue comprising cobalt, iron, other valuable metals, and non-metal impurities. The filtrate was dried to powder and characterized by XRD.

High Temperature Treatment of the Residue Comprising Cobalt, Iron, Other Valuable Metals, and Non-Metal Impurities The filtration cake (residue) was dried and melted at a temperature of 1773K (1500° C.) in an alumina crucible with the addition of sodium tetraborate (Borax). Borax was used as flux in the amount of 200% by weight of the cake material.

Results and Discussion.

Figure 3:
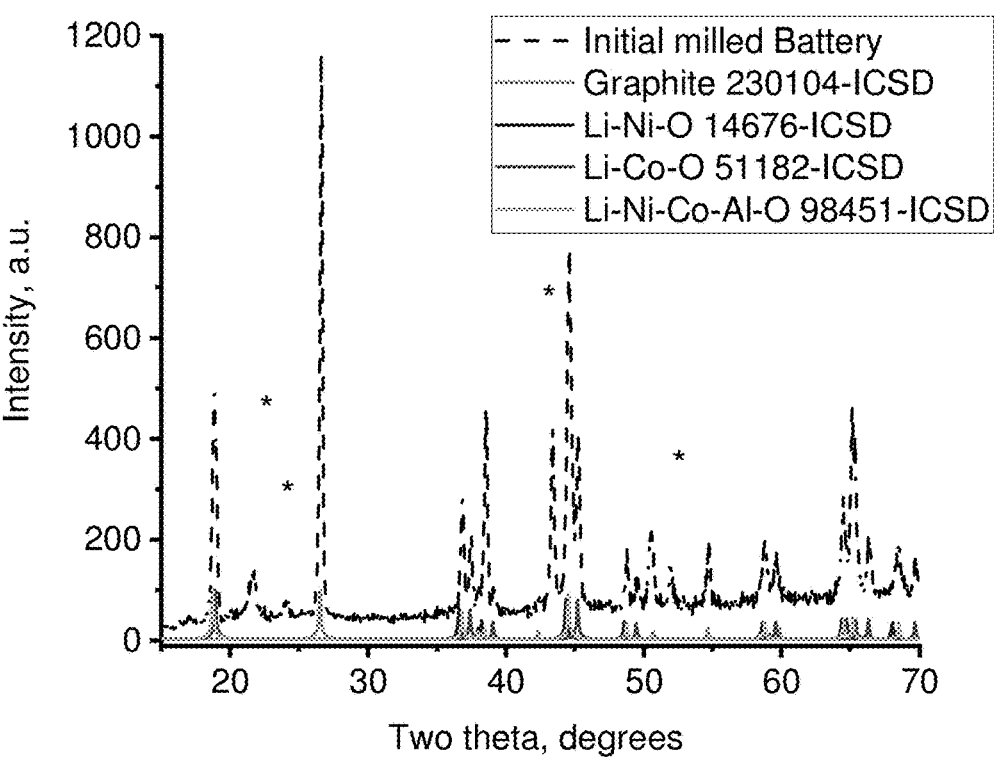
FIG. 3 presents X-ray diffraction pattern of the crushed/milled starting material. The diffraction peaks marked by (*) have not been definitively identified; metal alloys are one possibility.

ICP-MS analysis of the metal content of the starting material (in mass %) gave: Li—2.07, Co—6.91, Ni—7.69, Cu—4.58, Fe—5.46, Al—4.61, Sn—0.02, the remaining mass presumably accounted for by volatiles, and/or by elements with atomic weight below the lower limit for measurement of ICP-MS (atomic weight 7). The presence of graphite cannot be ascertained from ICP-MS results since it did not go into solution. The (magnetic) battery casings are assumed to be the source of the Fe detected in the starting material. The composition of the electrolyte nor of the separation membrane was unknown. The X-ray diffraction pattern of the powdered Li ion batteries is presented in FIG. 3.

Graphite, Li—Co oxide, Li—Ni—Co—Al oxide, and/or Li—Ni—Co oxide were present as highly crystalline material.

Thermodynamic Calculations.

Calculations of the Gibbs energy for reduction of the various metal oxides present in the spent LIBs were carried out as a guide for the choice of temperatures for the reductive sintering process. The computer program was developed based on standard values for the pure substances [Turkdogan E. T. (1980) Physical chemistry of high temperature technology. Academic Press, New York, p. 462]. The reference literature lacks thermodynamic constants (enthalpy and entropy) for complex oxides present in LIBs—e.g. lithium-nickel-cobalt-aluminum oxide (NCA). Furthermore, the degree of doping is not provided by the manufacturers. Therefore, calculations were necessarily carried out for individual oxides included within these compounds (reactions 2-4). Under sintering conditions, the Gibbs energy of reactions (1-3) is negative (15-120 KJ/mole). Calculations predict that reduction of Co, Ni, and Cu oxides can result in the formation of mixtures of Co, Ni, and Cu metals or their alloys within a wide temperature range. On the other hand, thermodynamic calculations showed that the reduction reaction of aluminum oxide (reaction 4) under such conditions is not favored. The Gibbs energy is large and positive: 700-800 kJ/mol. The calculated values of the Gibbs energy for reactions of the pure substances within the temperature range 673-1173 K are shown in Table 3.

TABLE 3

| Calculated values of the Gibbs energy (AG). | | | | | |
|---|---|---|---|---|---|
| | | Gibbs energy (AG), kJ/mole Temperature, K | | | |
| N | Reaction | 673 | 873 | 1073 | 1173 |
| 1 | $LiCoO_2(s) + 0.5\ CH_4(g) =$ $0.5\ Li_2CO_3(s) + Co(s) +$ $0.5\ H_2O(g) + 0.5\ H_2(g)$ | −76 | −96 | −119 | −132 |
| 2 | $CoO(s) + 0.25\ CH_4(g) =$ $Co(s) + 0.25\ CO_2(g) + 0.5$ $H_2O(g)$ | −14 | −28 | −42 | −49 |
| 3 | $NiO + 0.25\ CH_4\ (g) =$ $Ni + 0.25\ CO_2(g) + 0.5$ $H_2O(g)$ | −23 | −40 | −58 | −67 |
| 4 | $Al_2O_3\ (s) + 0.75\ CH_4(g) =$ $2\ Al\ (s) + 1.5\ H_2O(g) +$ $0.75\ CO_2(g)$ | 864 | 801 | 736 | 703 |

(s)—solid, (g)—gas.

Reduction Sintering with Natural Gas.

The clinker powders which remained in the reactor following 1 h reduction sintering of the crushed and sieved spent LIBs with the natural gas/nitrogen mixture between 723-1123 K were characterized and quantitated for metal content by ICP-MS following dissolution in boiling aqua regia. ICP-MS chemical analysis is presented in Table 4 as a function of temperature. The missing mass must be attributed to the insoluble graphite, to volatiles and to elements, which are too light to be detected by ICP-MS.

TABLE 4

| ICP-MS chemical analysis of the clinker as a function of sintering temperature | | | | | | | |
|---|---|---|---|---|---|---|---|
| Sintering | particulate spent lithium-ion batteries material, mass % | | | | | | |
| temperature, K | Li | Al | Fe | Co | Ni | Cu | Total cations |
| 723 | 2.2 | 3.8 | 12.2 | 9.3 | 8.4 | 6.9 | 42.8 |
| 823 | 2.9 | 6.0 | 8.7 | 12.5 | 9.8 | 9.8 | 49.5 |
| 873 | 2.6 | 5.8 | 5.4 | 12.9 | 9.1 | 5.6 | 41.4 |
| 923 | 2.7 | 7.1 | 15.9 | 14.5 | 9.4 | 8.9 | 58.5 |
| 973 | 2.3 | 2.8 | 16.2 | 12.1 | 8.9 | 8.1 | 50.4 |
| 1023 | 2.3 | 4.2 | 13.9 | 12.4 | 9.0 | 9.2 | 51.0 |
| 1123 | 2.0 | 3.9 | 11.8 | 11.5 | 8.4 | 13.6 | 51.2 |

Figure 4:
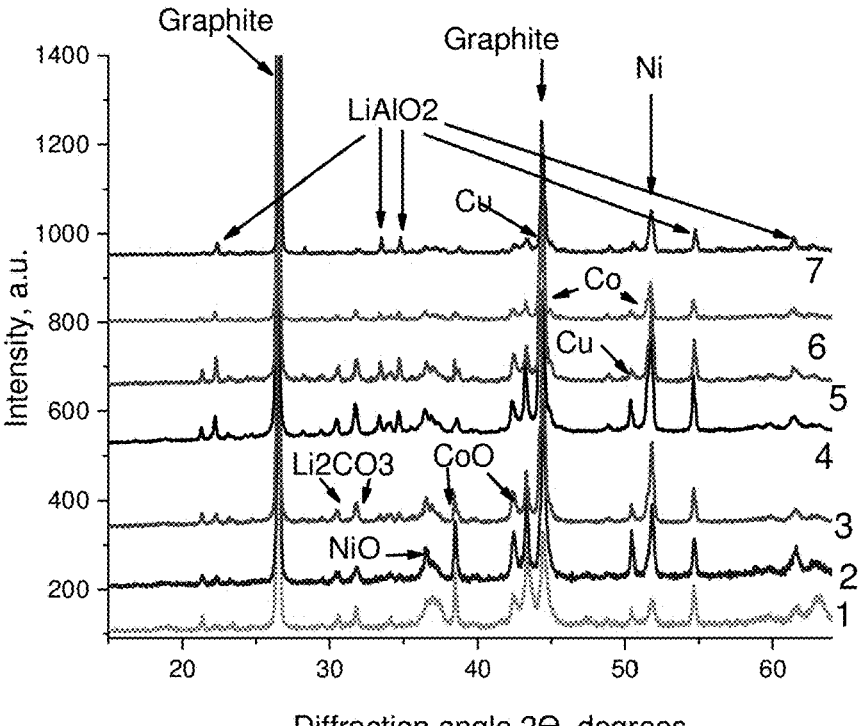
FIG. 4 presents Powder XRD patterns obtained following 1 hr reductive sintering at temperatures: 1—723 K, 2—823 K, 3—873 K, 4—923 K, 5—973 K, 6—1023 K, 7—1123 K.

Powder XRD patterns obtained following 1 hr reductive sintering at different temperatures are presented on the FIG. 4.

By comparing these powder diffraction patterns with the room temperature XRD pattern of the starting material, it was found that the more complex oxides-$LiNiCoO_2$ and $LiNiCoAlO_2$ were not present at 723K, the only crystalline compounds detected are $Li_2CO_3$, $LiCoO_2$, CoO and NiO. When the sintering temperature is increased to 823K, crystals of Li carbonate, CoO, as well as Co, Ni metals also appeared. At the highest sintering temperature, 1123K, $LiAlO2$, CoO and Co, Ni metals dominated the diffraction pattern. At a temperature above the melting point of lithium carbonate (996 K), no peaks of lithium carbonate were observed on the XRD diffraction pattern. This was due to the fact that, according to the conditions of the experiments, the sample after test was rapidly cooled to room temperature (100-120 K/min) and did not have enough time for the crystallization of lithium carbonate.

Leaching.

Figure 5:
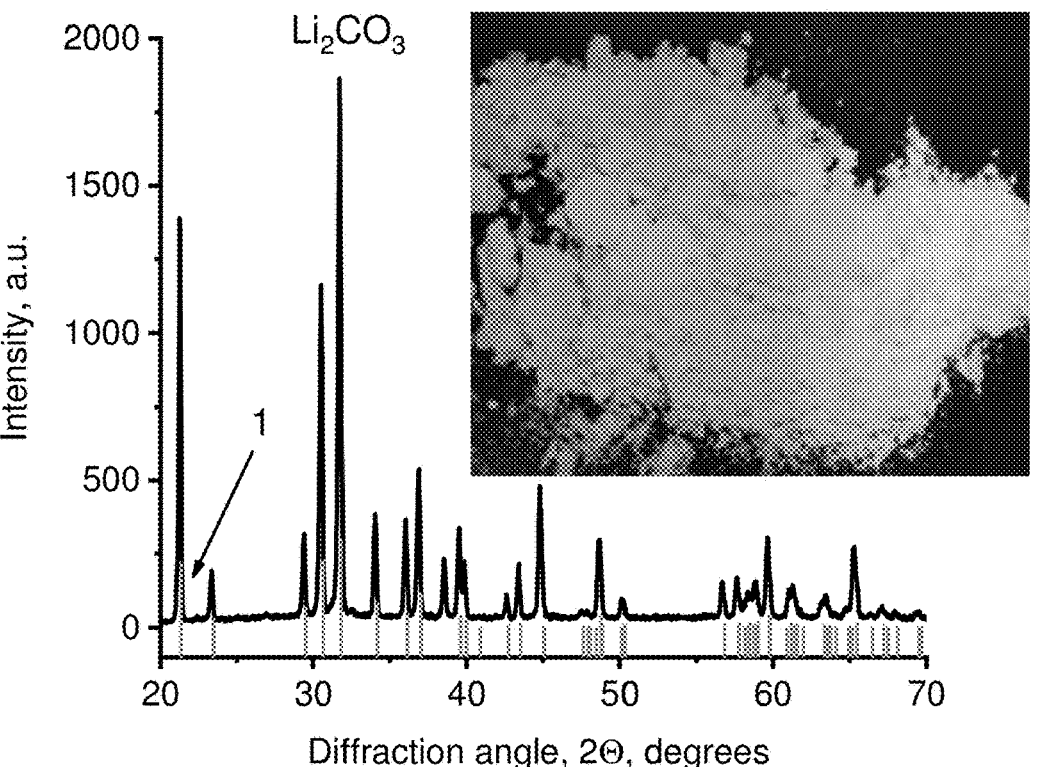
FIG. 5 is a photograph and X-ray diffraction pattern of the received $Li_2CO_3$ powder. The symbol 1 correspond to the standard ICSD powder XRD patterns of the Li2CO3.

After cooling, the clinker powder was leached with a cold water-ice mixture and filtered. The weight ratio of solid/liquid was 1/(10-30). The filtrate was heated to boiling temperature and $Li_2CO_3$ precipitated. The precipitate was then air-dried; a photograph and X-ray diffraction pattern of the resulting $Li_2CO_3$ powder are presented in FIG. 5.

Figure 6:
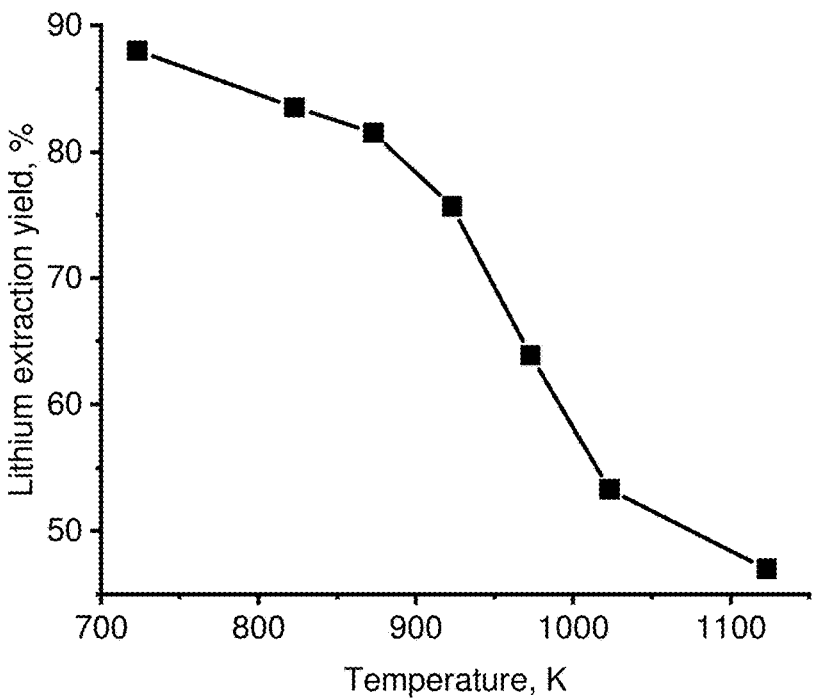
FIG. 6 presents the effect of sintering temperature on lithium extraction yield.

Effect of the sintering temperature on the lithium extraction yield as $Li_2CO_3$ is presented in the Table 5 and FIG. 6. Material balances for each test were calculated. It was found that the maximum extraction yield of lithium (~90%) was achieved at a sintering temperature of 700-800K With increase in temperature, the extraction yield of lithium decreased sharply; at 1000K, the lithium extraction yield is only ~50%.

It may be due to the formation of insoluble $LiAlO_2$ at high sintering temperature. The effect of sintering temperature on $LiAlO_2$ formation is presented in Table 6.

TABLE 5

| Lithium extraction yield to the filtrate. | | | | | |
|---|---|---|---|---|---|
| Sintering temperature, K | Initial Battery material quantity, gr | Lithium content in the initial battery, mass % | Li quantity in the initial battery sample, mg | Li quantity in the filtrate after water leaching, mg | Lithium extraction yield to the filtrate, % |
| 723 | 3.56 | 2.07 | 73.7 | 64.8 | 87.9 |
| 823 | 3.20 | 2.07 | 66.2 | 55.3 | 83.5 |
| 873 | 3.07 | 2.07 | 63.5 | 51.6 | 81.3 |
| 923 | 3.70 | 2.07 | 76.6 | 58.1 | 75.8 |
| 973 | 3.07 | 2.07 | 63.5 | 40.6 | 63.9 |
| 1023 | 3.10 | 2.07 | 64.1 | 34.2 | 53.4 |
| 1123 | 3.28 | 2.07 | 67.9 | 31.8 | 46.8 |

TABLE 6

| The effect of sintering temperature on $LiAlO_2$ formation. | | | | | | | | |
|---|---|---|---|---|---|---|---|---|
| Temperature, K | 723 | 823 | 873 | 923 | 973 | 1023 | 1073 | 1123 |
| $LiAlO_2$ content by XRD, mass % | n.d. | n.d. | 2.1 | 2.1 | 4.0-4.6 | 4.9 | 6.9 | 16.0 | n.d.—non detected

Figure 7:
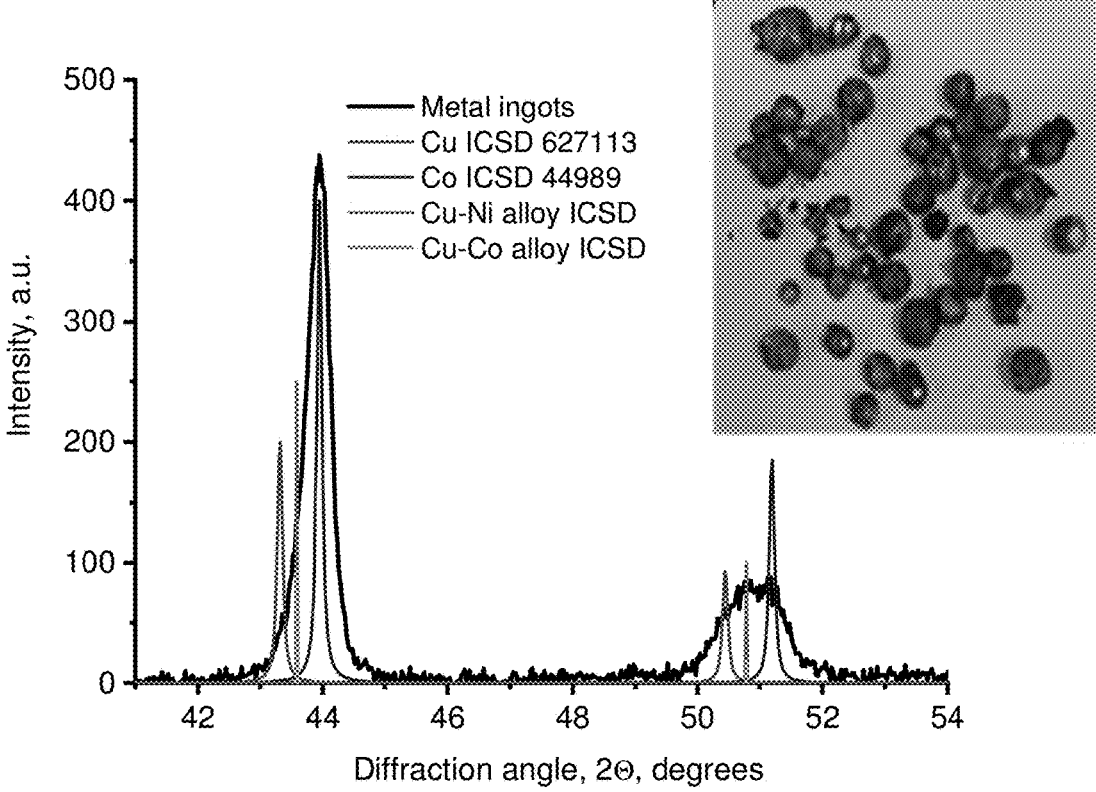
FIG. 7 presents X-ray diffraction pattern and color photograph of the metal ingots. The ball-shaped metal ingot particle diameter ranged from 3-8 mm.

Following ice-water leaching and filtration, the residue comprising cobalt, iron, other valuable metals, and non-metal impurities were air-dried and melted at a temperature of 1773K in an alumina crucible with the addition of sodium tetraborate (Borax). Borax was used as a flux in the amount of 200% by weight of the filtration cake. Non-ferrous metals (Ni, Co and Cu) alloyed as metal ingots, and the remaining lithium and iron-into slag. Metal ingots were characterized by X-ray diffraction (XRD). A photograph and X-ray diffraction pattern of the ball shaped metal ingots are presented in FIG. 7. Based on ICSD standards and Powder Diffraction File (PDF) patterns, the following crystalline phases were identified: Co, Ni, $CO_{0.52}Cu_{0.48}$.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for recovering valuable metals from a spent lithium ion battery, wherein the lithium ion battery is lithium titanate ($Li_4Ti_5O_{12}$), lithium cobalt oxide ($LiCoO_2$), lithium nickel manganese cobalt oxide $LiNi_xMn_yCo_zO_2$ (x+y+z=1), lithium nickel cobalt aluminum oxide $LiNi_xCo_yAl_2O_2$ (x+y+z=1) or lithium phosphate ($Li_3PO_4$) battery, the method comprises:

a) opening a spent lithium ion battery (LIB), and remove its cover;

b) grinding the spent LIB, after removing its cover at predetermined temperature to obtain a particulate spent lithium ion batteries material including particles having a predetermined grain size;

c) separating from said particulate spent lithium ion batteries material any plastic and Teflon matrix;

d) treating said separated particulate spent lithium ion batteries material with a reducing gas comprising $CH_4$/$N_2$ gas mixture, $CH_4$/air gas mixture, $CH_4$ gas, or treated with solid carbon at predetermined temperature for carbonation of the lithium to obtain a particulate spent lithium ion batteries material comprising lithium carbonate;

e) treating said particulate spent lithium ion batteries material comprising lithium carbonate with water at a temperature of 25° C. or below and optionally with additional $CO_2$ obtaining a slurry;

f) filtering the slurry obtained in step (e) to obtain a lithium carbonate filtrate and a residue comprising cobalt, iron, other valuable metals, and non-metal impurities;

g) heating said lithium carbonate filtrate at predetermined temperature to lithium carbonate precipitate sedimentation followed by filtration to obtain lithium carbonate precipitate and a mother liquid; and h) treating said residue comprising the valuable metals, and non-metal impurities of step (f) with a flux at predetermined temperature to obtain valuable metallic ingots;

wherein the valuable metals comprise cobalt, nickel, manganese, titanium, tin, lead, zinc, or combination thereof; and wherein the method does not comprise an alkaline earth hydroxide treatment.

2. The method of claim 1, wherein said particulate spent lithium ion batteries material obtained in step (b) has a grain size of between 2-10 mm.

3. The method of claim 2, wherein said particulate spent lithium ion batteries material obtained in step (b) has a grain size of between 2-5 mm.

4. The method of claim 1, wherein the predetermined temperature of the grinding of the remaining spent LIB to obtain a particulate spent lithium ion batteries material is between 20-50° C.

5. The method of claim 1, wherein the separation of plastic and Teflon matrix from said particulate spent lithium ion batteries material is done by air separation.

6. The method of claim 1, wherein said treatment of step (d) of said separated particulate spent lithium ion batteries material with the reducing gas is carried out at a temperature of between 100° C. to 900° C.

7. The method of claim 1, wherein said lithium carbonate precipitate obtained in step (g) is further dried to obtain a dry lithium carbonate powder.

8. The method of claim 1, wherein the partial pressure $CH_4$ in said $CH_4$/air mixture is from 0.1% to 100% v/v.

9. The method of claim 1, wherein the partial pressure $CH_4$ in said $CH_4$/$N_2$ mixture is from 0.1% to 100% v/v.

10. The method of claim 1, wherein heating at predetermined temperature of said lithium carbonate filtrate of step (g) is carried out at a temperature of between of 80° C. to 120° C.

11. The method of claim 1, wherein said flux for smelting the other valuable metals comprises silica, carbon, calcium oxide, sodium oxide, alumina, iron oxide, Sodium tetraborate or combination thereof.

12. The method of claim 1, wherein treating said residue comprising cobalt, other valuable metals, iron and non-metal impurities with a flux of step (h) is carried out at a temperature in the range of 1200° C. to 1500° C.

13. The method of claim 1, wherein said metallic ingots of step (h) are selected from cobalt, nickel, manganese, titanium, tin, lead, zinc, and combination thereof or iron ingots.

14. The method of claim 1, wherein said treatment of step (d) of said separated particulate spent lithium ion batteries material treated with solid carbon is carried out at a temperature of between 600° C. to 900° C.

* * * * *